A. C. Funston,
Toy.
Nº 74,815.          Patented Feb. 25. 1868.
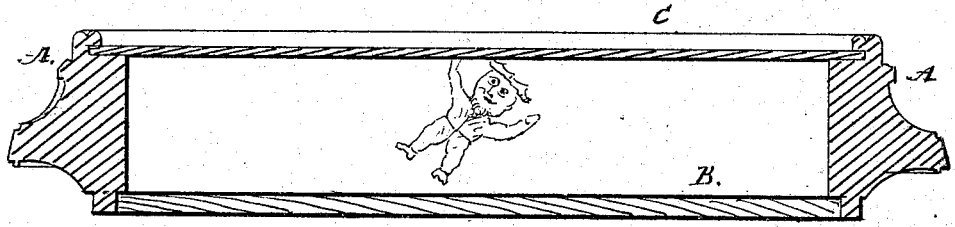
attest:
Wm Albert Steel
John Parker
A. C. Funston
By his Atty
H. Howson

United States Patent Office.

A. C. FUNSTON, OF PHILADELPHIA, PENNSYLVANIA.

Letters Patent No. 74,815, dated February 25, 1868.

TOY.

*The Schedule referred to in these Letters Patent and making part of the same.*

TO ALL WHOM IT MAY CONCERN:

Be it known that I, A. C. FUNSTON, of Philadelphia, Pennsylvania, have invented a new Toy; and I do hereby declare the following to be a full, clear, and exact description of the same.

My invention consists of a case having a glass top, and containing a number of figures or particles of any substance, which will be attracted to the glass when the latter is electrically excited, (by being rubbed or in any other manner,) the figures being thus caused to assume various amusing positions, and to move from one part of the case to the other, until the charge of electricity has passed from the glass plate.

In order to enable others to make and use my invention, I will now proceed to describe its construction and operation, reference being had to the accompanying drawing, which forms a part of this specification, and the figure in which is a sectional elevation of my new toy.

A A are the sides, and B is the bottom of a case, which may be of any suitable shape or material, and in the top of the case is fitted a plate, C, of glass. Within the case are a number of particles or figures of cork, paper, pith, feathers, or other light material, and of any desired shape. When the plate C is excited electrically by rubbing it briskly with a pad of silk, rubber, or other substance, the figures within the case will be attracted to or toward the plate, and on coming in contact with the latter, will be charged with electricity and then repelled, being thus caused to assume various positions, and to move about from one part of the case to the other, these movements affording much amusement by their singularity, and constant and unexpected changes.

I claim as my invention, and desire to secure by Letters Patent—

A toy, consisting of a case, having a glass top, and containing figures or particles of paper or equivalent material, to which movements may be imparted, substantially as and for the purpose described.

In testimony whereof, I have signed my name to this specification in the presence of two subscribing witnesses.

A. C. FUNSTON.

Witnesses:
  H. HOWSON,
  W. J. R. DELANY.